US008739263B2

(12) United States Patent
Azuma

(10) Patent No.: US 8,739,263 B2
(45) Date of Patent: May 27, 2014

(54) COMMUNICATION APPARATUS, WIRELESS COMMUNICATION SYSTEM, AND METHOD OF SETTING ASSOCIATION INFORMATION

(75) Inventor: Yoshikazu Azuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 13/048,076

(22) Filed: Mar. 15, 2011

(65) Prior Publication Data

US 2011/0231922 A1 Sep. 22, 2011

(30) Foreign Application Priority Data

Mar. 16, 2010 (JP) ................................ 2010-059848

(51) Int. Cl.
*H04L 29/06* (2006.01)
*G06F 21/00* (2013.01)

(52) U.S. Cl.
USPC ............................................. 726/9; 713/172

(58) Field of Classification Search
None
See application file for complete search history.

(56) References Cited

U.S. PATENT DOCUMENTS

| 2006/0101280 | A1 | 5/2006 | Sakai | |
|---|---|---|---|---|
| 2008/0101273 | A1* | 5/2008 | Everest | 370/315 |
| 2008/0222711 | A1* | 9/2008 | Michaelis | 726/7 |
| 2008/0274770 | A1* | 11/2008 | Park et al. | 455/557 |
| 2009/0052348 | A1* | 2/2009 | Kato et al. | 370/254 |

FOREIGN PATENT DOCUMENTS

| CN | 101617346 | | 12/2009 |
|---|---|---|---|
| EP | 1655922 | A1 | 5/2006 |
| EP | 2026615 | A2 | 2/2009 |
| JP | 2000-20439 | | 1/2000 |
| JP | 2008-512891 | | 4/2008 |
| JP | 4205751 | | 10/2008 |
| JP | 2009-260821 | | 11/2009 |
| JP | 2010-130240 | | 6/2010 |
| WO | WO 2004/109481 | A1 | 12/2004 |
| WO | WO 2006/027725 | A1 | 3/2006 |
| WO | WO 2008/051888 | A2 | 5/2008 |

OTHER PUBLICATIONS

Jun. 8, 2011 European search report in connection with counterpart European patent application No. 11 25 0315.
Chinese official action dated Apr. 2, 2013 (including English translation) in corresponding Chinese patent application No. 2011 10 05 8855.6.
Sep. 17, 2013 Japanese official action in connection with corresponding Japanese patent application No. 2010-059848.

* cited by examiner

*Primary Examiner* — Gilberto Barron
*Assistant Examiner* — Izunna Okeke
(74) *Attorney, Agent, or Firm* — Cooper & Dunham LLP

(57) ABSTRACT

A communication apparatus includes a first communication unit that performs a wireless communication with two storage media that store therein association information for establishing a wireless connection and user identification information for identifying a user, respectively, and receives the association information and the user identification from the two storage media; a determination unit that performs user authentication based on the user identification information, determines whether or not to validate the association information based on the user authentication, and if the association information is determined to be valid, sets the association information; and a second communication unit that establishes a wireless connection based on the association information set by the determination unit.

10 Claims, 8 Drawing Sheets

| ASSIGNED NUMBER | IMAGE FORMING APPARATUS ID | PERSONAL COMPUTER ID | ENCRYPTION KEY |
|---|---|---|---|
| 1 | AXXX | D000 | XXXXX |
| | | | |
| | | | |

FIG. 7

| AUTHENTICATION ID | PRINTER FUNCTION | SCANNER FUNCTION | COPY FUNCTION | DATA TRANSMISSION FROM INSIDE MPF | NUMBER OF COPIES | COLOR PRINT |
|---|---|---|---|---|---|---|
| person1 | AVAILABLE | AVAILABLE | AVAILABLE | ALLOWED | NOT LIMITED | AVAILABLE |
| person2 | NOT AVAILABLE | AVAILABLE | NOT AVAILABLE | NOT ALLOWED | 100 SHEETS/DAY | NOT AVAILABLE |
| ... | | | | | | |

FIG. 9

(): CURRENT OPERATING VALUES

PARAMETER MANAGEMENT (ADMINISTRATOR MENU)

- ■ WIRELESS LAN 1 : ENABLED
- ■ WIRELESS LAN 2 : DISABLED
- ■ UWB/WUSB : ENABLED
- ■ Bluetooth : DISABLED

MANAGEMENT SETTINGS OF EASY SETUP INFORMATION

------------------------------------------------

| | |
|---|---|
| NFC STATUS | : ENABLED |

NFC ASSOCIATION

| | |
|---|---|
| NFC ASSOCIATION IS ALWAYS ALLOWED | : ◉ YES    ○ NO |
| USER AUTHENTICATION IS NEEDED | : ◉ YES    ○ NO |
| MAIN COMMUNICATION UNIT | : [ UWB/WUSB ▼ ] |
| COMMUNICATION MODE | : [ WUSB DRD ▼ ] |
| UNENCRYPTED AND WEAKLY-ENCRYPTED COMMUNICATIONS ARE ADMITTED | : ○ YES    ◉ NO |

CONNECTION MANAGEMENT

| | |
|---|---|
| MAIN COMMUNICATION UNIT STATUS | : IN COMMUNICATION |
| COMMUNICATION ERROR STATUS | : NORMAL |
| PBC STATUS | : DISABLED |

PBC ASSOCIATION

| | |
|---|---|
| PBC ASSOCIATION IS ALWAYS ALLOWED | : ○ YES    ◉ NO |

COMMUNICATION APPARATUS, WIRELESS COMMUNICATION SYSTEM, AND METHOD OF SETTING ASSOCIATION INFORMATION

CROSS-REFERENCE TO RELATED APPLICATIONS

The present application claims priority to and incorporates by reference the entire contents of Japanese Patent Application No. 2010-059848 filed in Japan on Mar. 16, 2010.

BACKGROUND OF THE INVENTION

1. Field of the Invention

The present invention relates to a communication apparatus, a wireless communication system, and a method of setting association information.

2. Description of the Related Art

In recent years, technologies to make a wireless connection between communication apparatuses by wireless communication methods such as UWB (Ultra Wide Band) and WUSB (Wireless Universal Serial Bus) for data transmission and reception have been spreading rapidly. In such wireless communications, the communication apparatuses to be involved in the wireless connection share authentication information and encryption keys for encrypted communication, for example, so that outsiders would not make an unauthorized wireless connection or intercept the contents of the communications.

Before starting wireless communications, the information to be shared between the communication apparatuses (hereinafter, referred to simply as "association information") is typically exchanged between the communication apparatuses or set into the communication apparatuses by using a secure method and the information is stored in each nonvolatile memory or the like. The stored association information is used for the subsequent wireless communications between the communication apparatuses.

The operation of exchanging or setting the association information before starting wireless communications has conventionally been performed by "cumbersome" procedures. A large number of methods have thus been proposed heretofore. The methods are broadly divided into an In-Band method where the association information is exchanged by communications that are performed between the communication apparatuses attempting to establish the wireless connection (hereinafter, referred to simply as "main communications"), and an Out-Of-Band method where the association information is set by communications other than main communications (hereinafter, referred to simply as "sub communications"). There are other known methods in which only minimum necessary authentication information is set by the Out-Of-Band method and other information is set by the In-Band method.

The Out-Of-Band method applying near field communication (hereinafter, referred to simply as "NFC") technologies for performing low-rate proximity wireless communications has recently shown promise and been put to practical use. Such methods are characterized in that association information can be exchanged or set in a near contact state for the sake of security and it is possible to set the association information into communication apparatuses by an intuitive operation of "touching", without connecting the communication apparatuses with a communication line.

The methods are classified into the following two types. One is a token method, in which a contactless IC card that is capable of near field communication (hereinafter, referred to simply as an "NFC token") and a reader/writer unit (hereinafter, referred to simply as an "NFC R/W unit") that is connected to a communication apparatus for association information to be set into perform near field communications therebetween, whereby the association information is set into the communication apparatus from the NFC token. The other is a Peer-To-Peer method, in which communication apparatuses for association information to be set into perform near field communications therebetween to exchange the association information.

For example, the Peer-To-Peer method is more usable between mobile devices or between a mobile device and an MFP (Multi Function Peripheral). For combinations such as a desktop PC and an MFP, and a fixed wireless LAN access point and a large number of MFPs, the token method is more usable. The methods may be selected for use depending on the communication apparatuses to set the association information into.

For example, in the method of setting association information disclosed in Japanese National Publication of International Patent Application No. 2008-512891, when device identification information uniquely associated with a peripheral is displayed on a host device, a user checks that the device identification information displayed on the host device matches information written on the peripheral and presses a key on the peripheral to establish wireless communications. With an NFC-capable host device and peripheral, the host device and peripheral are placed in contact with or in close proximity to each other so that a wireless connection is established between the communication apparatuses.

According to the conventional method of setting association information disclosed in Japanese National Publication of International Patent Application No. 2008-512891, however, it takes only a keystroke to complete the operation of setting association information, and wireless communications become possible between the communication apparatuses into which the association information is set. There has thus been a security problem, for example, because outsiders in the office can easily make a wireless communication to the communication apparatuses.

Meanwhile, conventional methods of setting association information using NFC tokens have the possibility that if an NFC token containing both association information and user identification information is lost, the NFC token may be abused by outsiders.

It is not troublesome at all for the administrator to only distribute NFC tokens containing both association information and user identification information to all intended members. Updating the information written in the tokens, however, requires cumbersome operations to collect the NFC tokens from all the members, update the tokens, and redistribute the same. There has thus been the problem of troublesome management of the NFC tokens for all the intended members.

The present invention has been achieved in view of the foregoing. It is thus an object of the present invention to provide a communication apparatus, a wireless communication system, and a method of setting association information, wherein it is possible to set association information into the communication apparatus by a simple operation and prevent outsiders from intercepting communications or making a wireless connection.

SUMMARY OF THE INVENTION

It is an object of the present invention to at least partially solve the problems in the conventional technology.

According to an aspect of the present invention, there is provided a communication apparatus including: a first communication unit that performs a wireless communication with two storage media that store therein association information for establishing a wireless connection and user identification information for identifying a user, respectively, and receives the association information and the user identification from the two storage media; a determination unit that performs user authentication based on the user identification information, determines whether or not to validate the association information based on the user authentication, and if the association information is determined to be valid, sets the association information; and a second communication unit that establishes a wireless connection based on the association information set by the determination unit.

According to another aspect of the present invention, there is provided a wireless communication system including: a first storage medium that includes association information for establishing a wireless connection; a second storage medium that includes user identification information for identifying a user; and a communication apparatus, in which the communication apparatus includes a first communication unit that performs a wireless communication with the first storage medium and the second storage medium and receives the association information and the user identification information, a determination unit that performs user authentication based on the user identification information, determines whether or not to validate the association information based on the user authentication, and if the association information is determined to be valid, sets the association information, and a second communication unit that establishes a wireless connection based on the association information set by the determination unit.

According to still another aspect of the present invention, there is provided a method of setting association information of a wireless communication system that includes a first storage medium including association information for establishing a wireless connection, a second storage medium including user identification information for identifying a user, and a communication apparatus, the method including: causing a first communication unit of the communication apparatus to perform a wireless communication with the first storage medium and the second storage medium and receive the association information and the user identification information; causing a determination unit of the communication apparatus to perform user authentication based on the user identification information, determine whether or not to validate the association information based on the user authentication, and if the association information is determined to be valid, set the association information; and causing a second communication unit of the communication apparatus to establish a wireless connection based on the association information set by the determination unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a chart showing use limitations on the image forming apparatus distinguished according to authentication ID in the wireless communication system according to the embodiment of the present invention;

FIG. 9 is a diagram showing an example of a parameter setting screen for an easy setup in the wireless communication system according to the embodiment of the present invention.

DETAILED DESCRIPTION OF THE PREFERRED EMBODIMENTS

Hereinafter, an embodiment of a communication apparatus, a wireless communication system, and a method of setting association information according to the present invention will be described in detail with reference to the accompanying drawings. The present invention is not limited to this embodiment.

Figure 1:
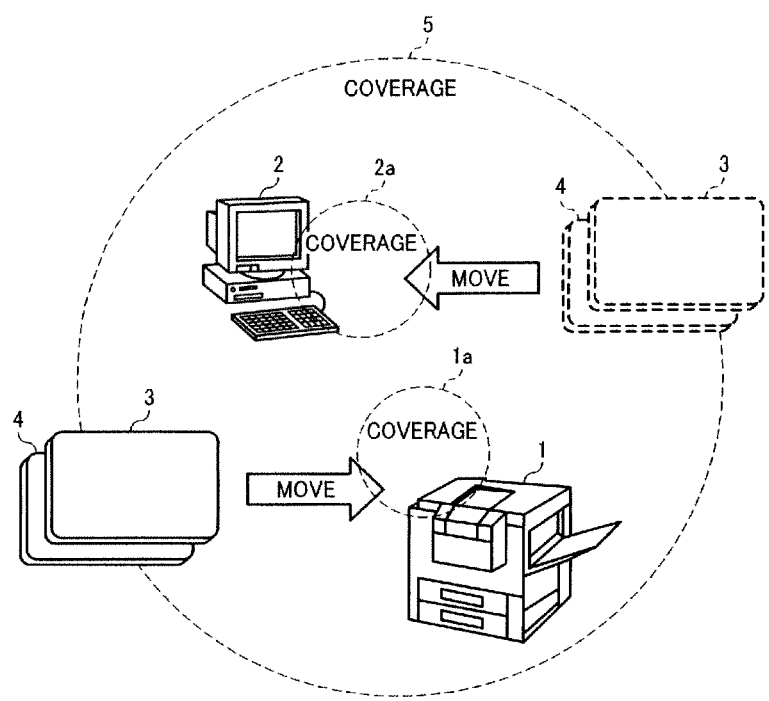
FIG. 1 is a diagram showing a schematic configuration of a wireless communication system according to an embodiment of the present invention.

Referring to FIG. 1, the schematic configuration of the wireless communication system according to the present embodiment will be described. FIG. 1 is a block diagram showing the schematic configuration of the wireless communication system according to the present embodiment.

(Schematic Configuration of Entire Wireless Communication System)

As shown in FIG. 1, the wireless communication system according to the present embodiment includes an image forming apparatus 1, a personal computer 2, an NFC token 3, and an NFC token 4. The image forming apparatus 1 according to the present embodiment is an MFP which combines a copy function, a facsimile function, a print function, a scanner function, a function to distribute input images (such as an image of an original scanned by the scanner function and an image input by the facsimile function), and the like. The personal computer 2 includes a CPU, storing units such as a RAM and a ROM, and a bus connecting them (none of which is shown), with a hardware configuration utilizing an ordinary computer.

The image forming apparatus 1 has a built-in main communication device 34 (see FIG. 3) having a wireless communication function of wireless USB method, or is connected with such a main communication device 34. Similarly, the personal computer 2 has a built-in main communication device (not shown) having a wireless communication function of wireless USB method, or is connected with such a main communication device (not shown). The image forming apparatus 1 and the personal computer 2 are in a coverage 5 of the wireless communication of wireless USB method, so that the image forming apparatus 1 and the personal computer 2 can perform wireless communications of wireless USB method with each other.

The NFC token 3 is a storage medium that is capable of wireless communications of near field communication method. The NFC token 3 stores therein association information that is necessary for wireless communications of wireless USB method performed between the image forming apparatus 1 and the personal computer 2. Similarly, the NFC token 4 is a storage medium that is capable of wireless communications of near field communication method, and stores therein user identification information on the personal computer 2. The association information stored in the NFC token 3 includes an ID for identifying the image forming apparatus 1, an ID for identifying the personal computer 2, and an encryption key for encrypting the IDs and communication data.

The image forming apparatus 1 has a built-in sub communication device 33 (see FIG. 3) capable of wireless communications of near field communication method, or is USB-connected to an NFC R/W unit (not shown) that serves as the sub communication device. Similarly, the personal computer 2 has a built-in sub communication device (not shown) capable of wireless communications of near field communication method, or is USB-connected to an NFC R/W unit (not shown) that serves as the sub communication device. The NFC R/W units are needed when setting association information. After the setting of the association information, the USB connection between the image forming apparatus 1 or the personal computer 2 and its NFC R/W unit may be disconnected. The present embodiment will hereinafter deal with the case of using the NFC R/W units that are USB-connected to the image forming apparatus 1 and the personal computer 2 instead of the sub communication devices 33.

When the NFC tokens 3 and 4 enter a coverage 1*a* of the NFC R/W unit that is USB-connected to the image forming apparatus 1 and are held over the NFC R/W unit (or brought into touch with the NFC R/W unit), the NFC tokens 3 and 4 start near field communications with the image forming apparatus 1, being driven by currents induced by the electric field from the NFC R/W unit. Similarly, when the NFC tokens 3 and 4 enter a coverage 2*a* of the NFC R/W unit that is USB-connected to the personal computer 2 and are held over the NFC R/W unit (or brought into touch with the NFC R/W unit), the NFC tokens 3 and 4 start near field communications with the personal computer 2.

Figure 2:
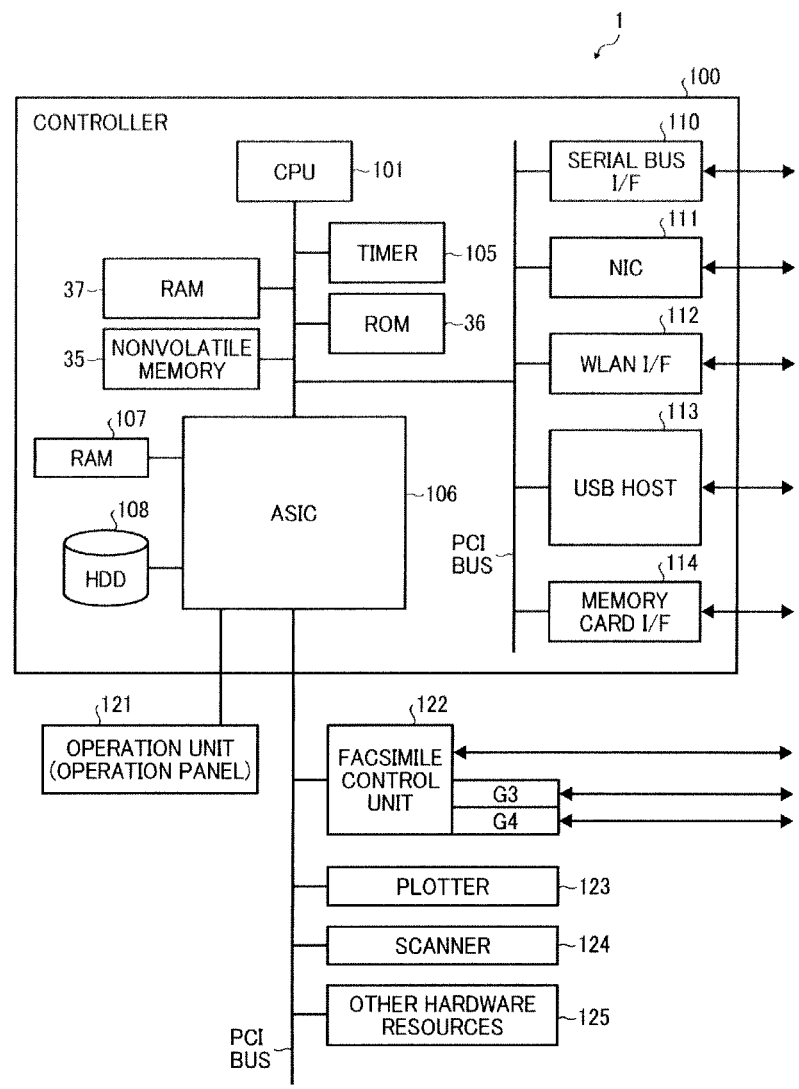
FIG. 2 is a block diagram showing a hardware configuration of an image forming apparatus exemplified as a communication apparatus in the wireless communication system according to the embodiment of the present invention.

Next, the hardware configuration of the image forming apparatus in the wireless communication system of the present embodiment will be described with reference to FIG. 2. FIG. 2 is a block diagram showing the hardware configuration of the image forming apparatus in the wireless communication system according to the present embodiment.

(Hardware Configuration of Image Forming Apparatus)

The image forming apparatus 1 according to the present embodiment will be described as being an MFP (Multi Function Peripheral) which combines a copy function, a facsimile function, a print function, a scanner function, a function to distribute input images (such as an image of an original scanned by the scanner function and an image input by the facsimile function), and the like. The configuration of the image forming apparatus 1 is not limited thereto, however.

As shown in FIG. 2, the image forming apparatus 1 includes a controller 100, an operation unit 121, a facsimile control unit 122, a plotter 123, a scanner 124, and other hardware resources 125. The controller 100 is connected to the facsimile control unit 122, the plotter 123, the scanner 124, and the other hardware resources 125 through a PCI (Peripheral Component Interconnect) bus.

The controller 100 is a controller for controlling the entire image forming apparatus. The controller 100 controls image formation, communications, input from the operation unit 121, screen display on the operation unit 121, and the like. The plotter 123 is a printer engine or the like that can be connected to the PCI bus. Examples include a monochrome plotter, a one-drum color plotter, and a four-drum color plotter. The scanner 124 is an image scanner which scans an original and generates image data on the original. The other hardware resources 125 are a representation of various devices other than mentioned above.

The controller 100 includes a CPU 101, a RAM (Random Access Memory) 37, a readable and writable nonvolatile memory 35, a ROM (Read Only Memory) 36, a timer 105 as a clocking unit, and an ASIC (Application Specific Integrated Circuit) 106 which are connected to the PCI bus, and a local memory RAM 107 and a hard disk drive (HDD) 108 which are connected to the ASIC 106.

The controller 100 further includes a serial bus interface (hereinafter, referred to simply as "serial bus I/F") 110, a NIC (Network Interface Controller) 111, a WLAN interface (hereinafter, referred to simply as "WLAN I/F") 112, a USB host 113, and a memory card interface (hereinafter, referred to simply as "memory card I/F") 114.

The serial bus I/F 110 is connected to a cartridge substrate (not shown), for example. The serial bus I/F 110 is used to read and write management data from/to an EEPROM (Electrically Erasable and Programmable ROM) in each cartridge. The NIC 111 is connected to a network such as a LAN. The WLAN I/F 112 is connected to a device that performs wireless communications by using a communication method conforming to a wireless LAN standard. The USB host 113 detects connections with various USB devices (not shown), and transmits and receives data to/from the connected USB devices. The memory card I/F 114 detects connections with memory cards (not shown), and transmits and receives data to/from the connected memory cards.

The RAM 37 is a readable and writable memory that is intended, for example, for various types of application programs including a program for setting association information, as well as OS, various drivers, data decompression, printer drawing, and other purposes. The nonvolatile memory 35 is a memory that stores therein association information (including security information) to be shared with the personal computer 2. The ROM 36 is a read only memory to be used for storing various types of programs and data.

The ASIC 106 is an IC (Integrated Circuit) intended for image processing applications and includes hardware elements for image processing. The ASIC 106 also functions as a bridge for connecting an AGP bus, the PCI bus, the RAM 107, and the HDD 108 to each other. The ASIC 106 includes the following: a PCI target; an AGP master; an arbiter (ARB) that constitutes the core of the ASIC 106; a memory controller that controls the RAM 107; a plurality of DMACs (Direct Memory Access Controllers) that perform rotation and other processing on image data by hardware logics or the like; and a PCI unit that performs data transfer with the facsimile control unit 122, the plotter 123, the scanner 124, and the other hardware resources 125 through the PCI bus. The facsimile control unit 122, the plotter 123, the scanner 124, and the other hardware resources 125 are connected to the ASIC 106 through the PCI bus.

The RAM 107 is a local memory to be used as a copy image buffer and a coding buffer. The HDD 108 is a storage for storing image data, programs, font data, and forms.

The operation unit 121 includes an operating device for the user to input instructions from and a display device for displaying information, the devices being integrated with each other. For example, the operation unit 121 is composed of a touch panel. An application for setting association information (hereinafter, referred to simply as "easy setup") is activated by a user operation on the touch panel. When association information is properly set by the NFC token 3, the touch panel may display of the proper setting of the association information. When the NFC token 4 is held over the NFC R/W unit (or brought into touch with the NFC R/W unit), the operation unit 121 may display a message for requesting a password.

It should be noted that FIG. 2 shows only one typical example of the hardware configuration of the image forming apparatus 1, which is not restrictive. For example, PCI-express and other buses may be used for connection instead of the PCI bus. Bluetooth and other interfaces may also be provided.

Figure 3:
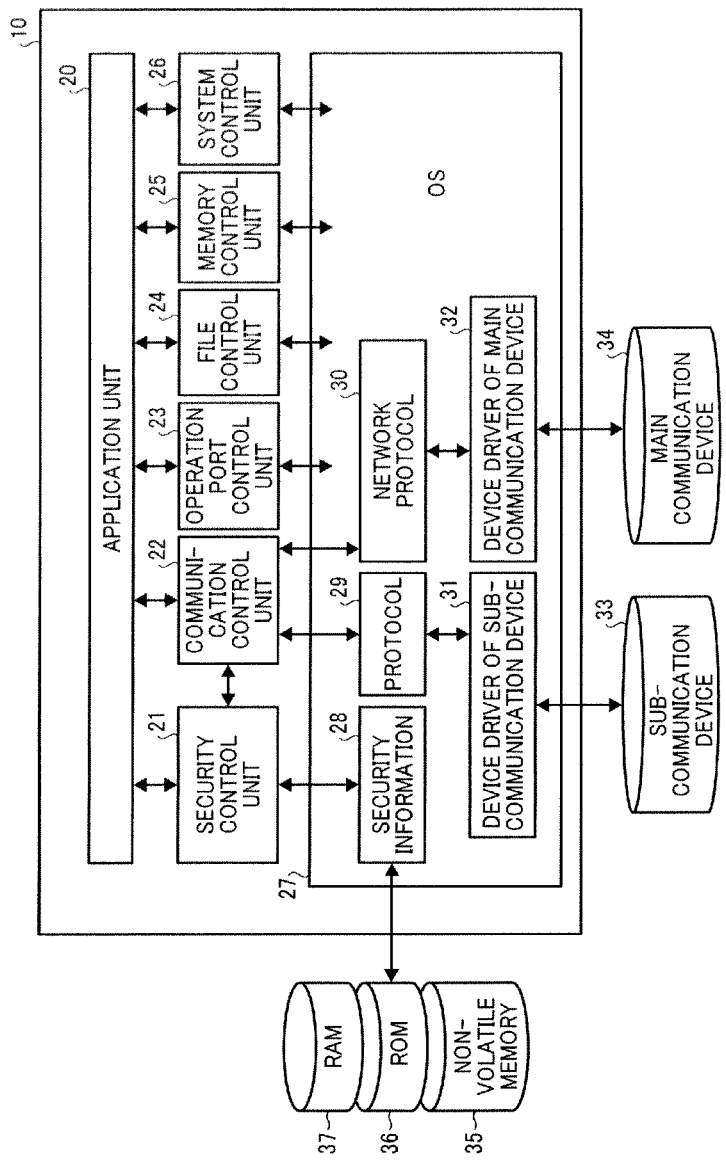
FIG. 3 is a block diagram showing a software configuration of the image forming apparatus shown in FIG. 2.

Next, the functional configuration of the image forming apparatus in the wireless communication system of the present embodiment will be described with reference to FIG. 3. FIG. 3 is a block diagram showing the functional configuration of the image forming apparatus in the wireless communication system according to the present embodiment.
(Software Configuration of Image Forming Apparatus)

As shown in FIG. 3, a control unit 10 of the image forming apparatus 1 includes an application unit 20, a security control unit 21, a communication control unit 22, an operation port control unit 23, a file control unit 24, a memory control unit 25, a system control unit 26, and an OS (Operating System) 27.

The application unit 20 includes an application for performing encrypted communications and an easy setup for target communication apparatuses. The application unit 20 also includes an application for implementing a facsimile function, a printer function, a scanner function, a storage function, and the like.

The security control unit 21 stores association information including security information such as authentication information and encryption keys for encrypted communication into the nonvolatile memory 35, and provides security services for the application unit 20 and other control units. For example, the security control unit 21 performs data encryption and decryption processing.

The communication control unit 22 implements a function by which the application unit 20, the security control unit 21, a network protocol 30, and a device driver 32 of the main communication device 34 perform wireless communications of wireless USB method. The communication control unit 22 similarly implements a function by which the application unit 20, the security control unit 21, a protocol 29, and a device driver 31 of the sub communication device 33 perform wireless communications of near field communication method.

The operation port control unit 23 controls user's instruction input through the operation unit 121 and information display on the operation unit 121. The file control unit 24 controls reading and writing of files from/to the HDD 108. The memory control unit 25 controls memory read and write from/to the RAM 37, the nonvolatile memory 35, the ROM 36, and the like. The system control unit 26 exercises overall control on each unit of the application unit 20 to the device driver 32.

The OS 27 functions as an operating system, and includes security information 28, the protocol 29, the device driver 31, the network protocol 30, and the device driver 32. The protocol 29 and the network protocol 30 are protocol stacks for encrypted communications.

The device driver 32 controls the main communication device 34 which performs wireless communications with the personal computer 2. The device driver 31 controls the sub communication device 33 (NFC R/W unit) which performs wireless communications with the NFC tokens 3 and 4.

Figures 4, 5:
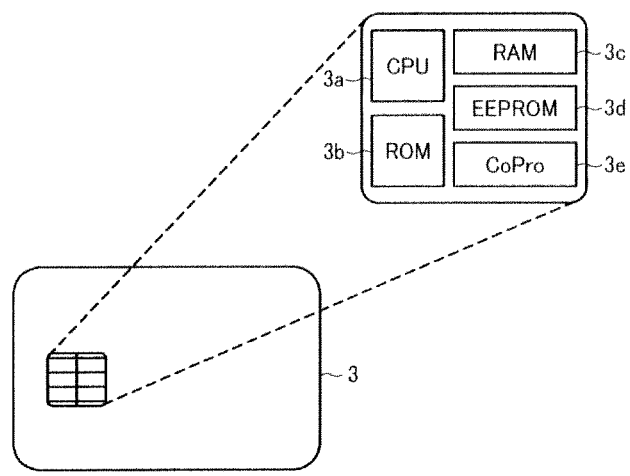
FIG. 4 is a diagram showing a schematic configuration of an IC card device in the wireless communication system according to the embodiment of the present invention.
FIG. 5 is a chart showing an example of a data configuration of association information according to the embodiment of the present invention.

Next, the schematic configuration of the NFC tokens in the wireless communication system of the present embodiment will be described with reference to FIG. 4. FIG. 4 is a block diagram showing the schematic configuration of the NFC tokens in the wireless communication system according to the present embodiment.
(Schematic Configuration of NFC Token)

As shown in FIG. 4, the NFC token 3 has a built-in IC chip to be driven by a current that is induced by the electric field of a R/W unit. The IC chip includes a central processing unit (CPU) 3a, a read only memory unit (ROM) 3b, a data processing memory unit (RAM) 3c, an electrically erasable and programmable memory unit (EEPROM) 3d, and a coprocessor unit (CoPro) 3e. The NFC token 4 has the same configuration as that of the NFC token 3.

For example, the EEPROM 3d of the NFC token 3 stores therein association information. The ROM 3b of the NFC token 3 stores therein a program necessary for setting the association information and an algorithm necessary for encrypting the association information. The CoPro 3e of the NFC token 3 is a processing unit that is intended to accelerate a public key encryption algorithm such as RSA (Rivest-Shamir-Adelman) encryption.

The NFC tokens used in the present embodiment are by way of example only. The NFC tokens may be formed as a mobile device that includes a built-in NFC communication chip with an independent power supply, HDD (Hard Disk Drive), real-time clock, and the like. NFC tokens of any form may be used as long as the association information can be stored and transported.

Next, referring to FIG. 5, an example of the data configuration of the association information to be received from the NFC token 3 in the wireless communication system according to the present embodiment will be described. FIG. 5 is a chart showing an example of the data configuration of the association information received from the NFC token 3.

In the wireless communication system of the present embodiment, as shown in FIG. 5, the identification information for mutual identification in a wireless communication includes the following: an ID for identifying the personal computer 2; an ID for identifying the image forming apparatus 1; and an encryption key for use in encrypting information including the identification information and communication data.

The CPU 101 of the image forming apparatus 1 temporarily stores the association information with the personal computer 2, received from the NFC token 3, into the RAM 37. After the completion of user authentication, the CPU 101 saves the association information in the nonvolatile memory 35. Similarly, the personal computer 2 temporarily stores the association information with the image forming apparatus 1, received from the NFC token 3, into its RAM. After the completion of user authentication, the association information is saved in a nonvolatile memory of the personal computer 2.

Figure 6:
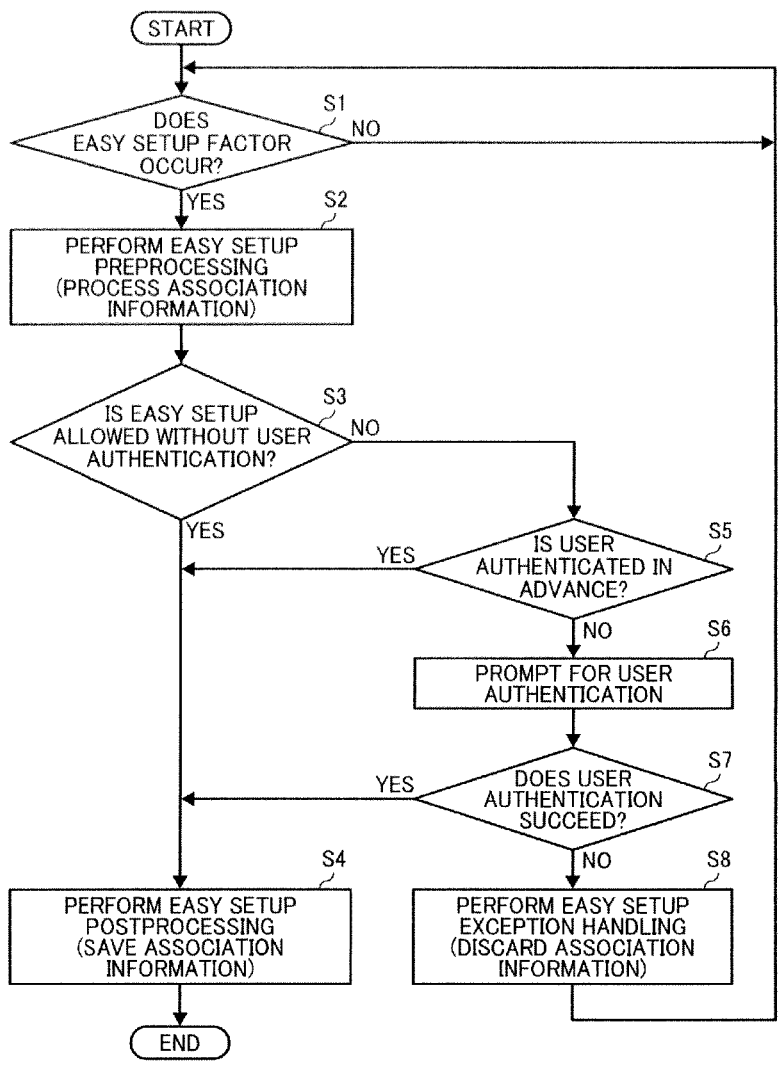
FIG. 6 is a flowchart showing the operation of the image forming apparatus in the wireless communication system according to the embodiment of the present invention.

Next, the operation of the image forming apparatus in the wireless communication system of the present embodiment when an easy setup mode is activated will be described with reference to FIG. 6. FIG. 6 is a flowchart showing the operation of the image forming apparatus in the wireless communication system of the present embodiment when the easy setup mode is activated.

The controller 100 (see FIG. 2) implemented in the image forming apparatus 1 includes the CPU 101, which controls each unit by loading programs corresponding to the OS 27 and the various control units onto the RAM 37 as the main memory and executing the programs. The following description of the operation will thus be given as if the OS 27 running on the CPU 101 serves as the operating agent.

Suppose that the easy setup mode of the image forming apparatus 1 has already been activated when the NFC token 3 is held over the NFC R/W unit that is USB-connected to the image forming apparatus 1. When a user operates the operation unit 121 of the image forming apparatus 1 to activate the easy setup mode, the image forming apparatus 1 may request the user to enter his/her user ID and password. The user may hold the NFC token 4 over the NFC R/W unit instead of entering his/her user ID and password from the operation unit 121.

When the NFC token 3 is brought close to the NFC R/W unit that is USB-connected to the image forming apparatus 1 and held over or brought into touch with the NFC R/W unit (i.e., when the NFC token 3 is moved into the coverage of the NFC R/W unit), the IC chip of the NFC token 3 is activated and the NFC token 3 starts a near field communication with the image forming apparatus 1. When the NFC token 3 is held over the NFC R/W unit (more specifically, when the NFC token 3 performs near field communications with the image forming apparatus 1 and the CPU 3a requests the image forming apparatus 1 to set association information), it is determined that there occurs an easy setup factor.

When the easy setup mode is activated, the OS 27 determines whether there occurs an easy setup factor (Step S1). If the easy setup factor is determined to occur (Yes at Step S1), the OS 27 proceeds to Step S2 to perform preprocessing of the easy setup. On the other hand, if it is determined that there is no easy setup factor (No at Step S1), the OS 27 remains at Step S1.

In response to the request from the NFC token 3 to set association information, the OS 27 requests association information from the NFC token 3. In response to the request, the NFC token 3 transmits the association information to the image forming apparatus 1. The OS 27 stores the association information from the NFC token 3 into the RAM 37 (Step S2). At this point, the association information is not used nor saved in the nonvolatile memory 35.

Next, when the NFC token 4 is brought close to the NFC R/W unit that is USB-connected to the image forming apparatus 1 and held over the NFC R/W unit (i.e., when the NFC token 4 is moved into the coverage of the NFC R/W unit), the IC chip of the NFC token 4 is activated and the NFC token 4 starts a near field communication with the image forming apparatus 1.

In response to the near field communication from the NFC token 4, the OS 27 determines whether or not to allow easy setup without user authentication (Step S3). If user authentication is not needed (Yes at Step S3), the OS 27 proceeds to Step S4. On the other hand, if user authentication is needed (No at Step S3), the OS 27 proceeds to Step S5. For example, if user authentication has been completed prior to the activation of the easy setup and there is no need to conduct user authentication again, the OS 27 can proceed to Step S4. With the NFC tokens, user authentication is needed because it is unknown who held the NFC tokens 3 and 4 over the NFC R/W unit. On the other hand, if a mobile terminal is used instead of the NFC tokens and user authentication is already completed with the mobile terminal, another user authentication may be determined not to be needed.

Next, the OS 27 performs postprocessing of the easy setup, saves the valid association information in the nonvolatile memory 35 (Step S4), and ends the easy setup. On the other hand, if user authentication is determined to be needed (No at Step S3), the OS 27 functions as a determination unit, and acquires a user ID and password from entries from the operation unit 121 and compares the user ID and password with those registered in the NFC token 4 to determine whether or not the user ID and password match (Step S5).

At Step S5, if the user ID and password match (user authentication succeeds) (Yes at Step S5), the OS 27 proceeds to Step S4. On the other hand, if the user ID and password do not match (No at Step S5), the OS 27 requests to enter a user ID and password again (Step S6). The OS 27 acquires a user ID and password from the new entries from the operation unit 121, and compares the user ID and password with those registered in the NFC token 4 to determine whether or not the user ID and password match (Step S7). At Step S7, if the user ID and password match (user authentication succeeds) (Yes at Step S7), the OS 27 proceeds to Step S4. On the other hand, if the user ID and password do not match (No at Step S7), the OS 27 performs easy setup exception handling and discards the invalid association information (Step S8).

The timer 105 may clock the elapsed time from the reception of the association information to the reception of the user identification information, and the OS 27 may determine whether the elapsed time exceeds a preset value. If the elapsed time exceeds the preset value, the OS 27 may display a message saying "Touch with the NFC token 4" on the operation unit 121 or make such a voice output. This makes it possible, for example, for a user who is not familiar with the operation after the touching of the NFC token 3 to set the association information into the image forming apparatus 1 easily. A limit value greater than the foregoing preset value may be set. If the elapsed time exceeds the limit value, the OS 27 may delete the association information stored in the RAM 37 as invalid information. Here, the OS 27 may even terminate the easy setup mode and return to its initial mode. For example, when the touching of the NFC token 3 is followed by no further operation, the image forming apparatus 1 can return to the initial mode for other users' use.

The timer 105 may clock the elapsed time from the reception of the user identification information to the reception of the association information, and the OS 27 may determine whether the elapsed time exceeds a preset value. If the elapsed time exceeds the preset value, the OS 27 may display a message saying "Touch with the NFC token 3" on the operation unit 121 or make such a voice output. This makes it possible, for example, for a user who is not familiar with the operation after the touching of the NFC token 4 to set the association information into the image forming apparatus 1 easily. A limit value greater than the foregoing preset value may be set. If the elapsed time exceeds the limit value, the OS 27 may delete the user identification information stored in the RAM 37 as invalid information. Here, the OS 27 may even terminate the easy setup mode and return to the initial mode. For example, when the touching of the NFC token 4 is followed by no further operation, the image forming apparatus 1 can return to the initial mode for other users' use.

The timer 105 may also clock the elapsed time since when the association information is determined to be valid, and the OS 27 may determine whether the association information that is determined to be valid based on the user identification exceeds a preset expiration period. If the association information exceeds the preset expiration period, the OS 27 may determine that the association information is invalid. Such a configuration can give limitations on the use period of the image forming apparatus 1 to a person who sets the association information between the image forming apparatus 1 and the personal computer 2 by using a guest NFC token 4.

The association information may have been set without user authentication and the user authentication may be performed when using the image forming apparatus 1 from the personal computer 2 (by using the NFC token 4 here). With such a configuration, it is possible to limit the functions of the image forming apparatus depending on a user who is using the personal computer, instead of limiting the functions of the image forming apparatus according to each individual personal computer.

The setting of association information is thus completed by performing easy setup on the image forming apparatus 1 and performing the easy setup on the personal computer 2 as well. The set association information is then used to perform wireless communications of wireless USB method between the personal computer 2 and the image forming apparatus 1.

The operation of the personal computer 2 when the easy setup mode is activated is the same as that of the image forming apparatus 1 when the easy setup mode is activated. A description thereof will thus be omitted.

Next, an operation example of the wireless communication system according to the embodiment of the present invention will be described.

In the wireless communication system of the present embodiment, the easy setup requires two types of NFC tokens, namely, an NFC token or NFC-capable mobile terminal that stores therein information needed for user authentication and a common NFC token that stores therein association information.

According to such a configuration, the information needed for user authentication and the association information are not written on the same storage medium (NFC token). This prevents the risk of unauthorized use of the image forming apparatus 1 through wireless communications from increasing even if an NFC token is lost.

OPERATION EXAMPLE 1

For example, visitors from other companies carry the guest NFC token 4, so that the guest NFC token 4 is used to set association information between the image forming apparatus 1 and the personal computer 2. The guest NFC token 4 contains information on functional limitations on the image forming apparatus 1 and use limitation information such as "no data transmission from inside the MFP allowed", "limitation on the number of copies", and "no color printing allowed". This can prevent unauthorized use of the MFP by outsiders (see FIG. 7). Because the setting of the association information is not completed until the NFC token 4 is held over or brought into touch with the NFC R/W unit to input the user ID and password for user authentication, it is possible to prevent unauthorized use of the MFP by outsiders.

OPERATION EXAMPLE 2

Limitations may be placed on hours available for easy setup. This can prevent abuse of easy setup on weekend and at nighttime. For example, staff NFC tokens 4 are set to be capable of easy setup as usual even on weekend and at nighttime. The guest NFC tokens 4 are set so that easy setup is only available during preset hours on weekdays. Such settings can prevent outsiders' activities to set the association information on weekend and at nighttime. The built-in timer 105 of the image forming apparatus 1 is used to detect the date and time.

When the easy setup needs updating, it is only necessary to update the NFC token 3 which is in common use in the department. This allows a reduction in management cost.

Completing the setting of the association information, the image forming apparatus 1 and the user terminal (personal computer 2 or mobile device) can perform secure wireless communications through their main communication devices. The image forming apparatus 1 becomes accessible from the user terminal (personal computer 2 or mobile device).

Now, the available functions of the image forming apparatus 1 may be limited depending on the authentication ID registered in the NFC token 4. For example, if the association information is set by using the staff NFC token 4, all the functions of the image forming apparatus 1 can be used from the user terminal (personal computer 2 or mobile device). On the other hand, if the association information is set by using the guest NFC token 4, only part of the functions of the image forming apparatus 1, such as a copy function, is made available to the user terminal (personal computer 2 or mobile device).

The period available for wireless communications may be set depending on the authentication ID registered in the NFC token 4. For example, if the association information is set by using the staff NFC token 4, the user terminal (personal computer 2 or mobile device) can perform wireless communications with the image forming apparatus 1 for an indefinite period. On the other hand, if the association information is set by using the guest NFC token 4, the user terminal (personal computer 2 or mobile device) is allowed to perform wireless communications with the image forming apparatus 1 for a preset limited period such as one day or one week. After a lapse of the preset period, the association information may be determined to be expired and may be erased.

Figure 8:
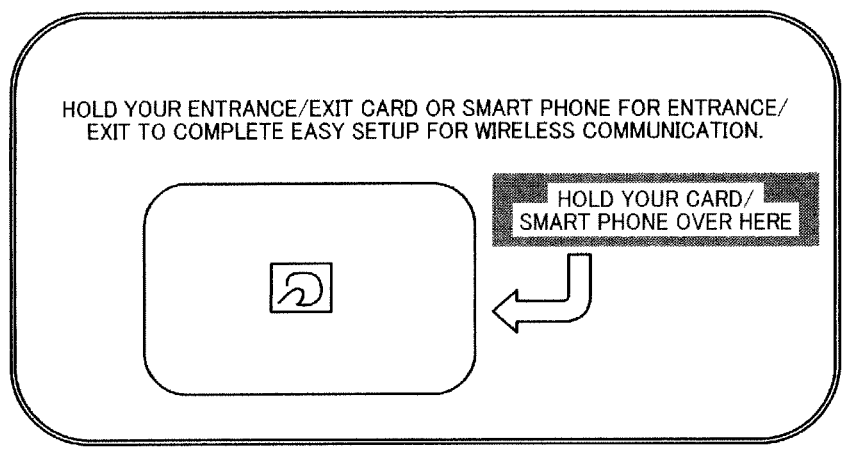
FIG. 8 is a diagram showing an example of a spot for an IC card device or the like to be held over in the wireless communication system according to the embodiment of the present invention.

Next, an example of an LCD screen for prompting user authentication will be described with reference to FIG. 8.

For example, a sub communication function may be provided behind an LCD screen which displays a message saying "Hold your smart phone over here" or "Touch with your smart phone", so that the NFC token is held over the position on the LCD screen when "Hold your smart phone over here" appears on the LCD screen. Such a configuration makes it possible to establish a wireless connection between the apparatuses easily without previous knowledge that is needed for the operation such as when to hold the NFC token over. While the diagram shows the case of prompting for user authentication with a smart phone, the same screen is applicable when establishing a wireless connection between the apparatuses by using NFC tokens.

As has been described above, the wireless communication system according to the present embodiment includes: a first communication unit that performs a wireless communication with two storage media that store therein association information for establishing a wireless connection and user identification information for identifying a user, respectively, and receives the association information and the user identification; a determination unit that performs user authentication based on the user identification information and determines whether or not to validate the association information based on the user authentication; and a second communication unit that establishes a wireless connection based on the association information set by the determination unit. Such a configuration makes it possible to set the association information into communication apparatuses by a simple operation and prevent outsiders from making a wireless connection to the apparatuses.

The provision of the determination unit, which performs user authentication based on the user identification information and sets the association information based on the result of the user authentication, and the second communication unit, which establishes a wireless connection based on the association information set by the determination unit, makes it possible to set the association information into communication apparatuses by a simple operation and prevent outsiders from making a wireless connection to the apparatuses.

The timer 105 may clock the elapsed time from the reception of the association information to the reception of the user identification information. If the elapsed time exceeds a preset value, the OS 27 may determine that the association information is invalid. Such a configuration can prevent unauthorized setting of the association information by outsiders.

The timer 105 may clock the elapsed time from the reception of the user identification information to the reception of the association information. If the elapsed time exceeds a preset value, the OS 27 may determine that the user identification information is invalid. Such a configuration can prevent unauthorized setting of the association information by outsiders.

The timer 105 may clock the elapsed time since when the association information is determined to be valid. If the association information that is determined to be valid based on the user authentication exceeds a preset expiration period, the OS 27 may determine that the association information is invalid. Such a configuration can give limitations on the use period of the image forming apparatus 1 to a person who sets the association information between the image forming apparatus 1 and the personal computer 2 by using the guest NFC token 4.

The wireless communication system according to the present embodiment may include a unit that selects whether or not to perform user authentication before the establishment of a wireless connection between the personal computer 2 and the image forming apparatus 1. Such a configuration makes it possible to omit user authentication when setting the association information. For example, the original object of preventing outsiders from making unauthorized use of the image forming apparatus 1 from the personal computer 2 can be achieved even when the user authentication is performed at the time of using the personal computer 2.

The wireless communication system according to the present embodiment may include a unit that sets a condition parameter needed for the wireless connection between the image forming apparatus 1 and the personal computer 2 by means of an easy setup. For example, when the administrator enters his/her password to the image forming apparatus 1 to open an administrator page, an administrator menu such as shown in FIG. 9 may be displayed on the screen of the image forming apparatus 1. The administrator can set or modify various condition parameters from the administrator menu. For example, settings can be made on items such as whether or not to allow the setting of association information all the time, whether or not user authentication is needed, and whether or not to encrypt data. Such settings allow flexible operations depending on the situation.

A handset (a mobile device or other form) that includes a built-in NFC communication chip with an independent power supply, HDD (Hard Disk Drive), real-time clock, and the like may be used instead of the NFC tokens 3 and 4. NFC tokens of any form may be used as long as data for association information sharing can be stored and transported.

In the wireless communication system according to the present embodiment, the easy setups to be performed by the image forming apparatus 1 and the personal computer 2 are provided as preinstalled in a ROM or the like.

In the wireless communication system according to the present embodiment, the easy setup to be performed by the image forming apparatus 1 may be provided in the form of an installable or executable file that is recorded on a computer-readable recording medium such as a CD-ROM, flexible disk (FD), CD-R, and DVD (Digital Versatile Disk).

In the wireless communication system according to the present embodiment, the easy setup to be performed by the image forming apparatus 1 may be stored in a computer that is connected to a network such as the Internet, and provided by downloading through the network. In the wireless communication system according to the present embodiment, the programs to be executed on the image forming apparatus 1 may be provided or distributed through a network such as the Internet.

In the wireless communication system according to the present embodiment, the easy setup to be performed by the image forming apparatus 1 is configured as a module that includes the foregoing determination unit. In terms of actual hardware, the CPU (processor) reads a control program from the ROM and executes the control program to load the above-mentioned unit on the RAM, whereby the determination unit is created on the RAM.

According to the present invention, there is provided an effect that it is possible to set the association information into the communication apparatus by a simple operation and prevent outsiders from intercepting communications or making a wireless connection.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus comprising:
   a communication unit configured to perform a wireless communication with a first NFC token comprising first storage media that store therein association information for establishing a wireless connection between the communication apparatus and a data processing apparatus, and perform a wireless communication with a second NFC token comprising second storage media that store therein user identification information for identifying a user; and
   a control unit configured to respond to a request from the first storage media to set association information, and obtain the association information from the first storage media via the communication unit and store the association information in volatile memory, and after obtaining the association information for establishing a wireless connection between the communication apparatus and a data processing apparatus, obtain the user identification information from the second storage media via the communication unit, and perform user authentication based on the user identification information obtained from the second storage media,
   wherein in a case in which the user authentication by the control unit is successful, the association information is stored by the control unit in non-volatile memory and a wireless connection is established between the communication apparatus and the data processing apparatus, and on the other hand, in a case that user authentication by the control unit is not successful, the association information is discarded from the volatile memory by the control unit, and wherein the communication apparatus further comprises a clocking unit that clocks elapsed time since when the control unit determines that the association information is valid, wherein in a case that the association information that is determined to be valid based on the user authentication exceeds a preset expiration period, the control unit determines that the association information is invalid.

2. The communication apparatus according to claim 1, further comprising a clocking unit that clocks elapsed time from reception of the association information to reception of the user identification information, wherein in a case that the elapsed time exceeds a preset value, the control unit determines that the association information is invalid.

3. The communication apparatus according to claim 1, further comprising a clocking unit that clocks elapsed time from reception of the association information to reception of the user identification information, wherein in a case that the elapsed time exceeds a preset value, the control unit determines that the user identification information is invalid.

4. The communication apparatus according to claim 1, further comprising a storing unit, wherein the control unit writes the association information that is determined to be valid based on the user authentication into the storing unit.

5. The communication apparatus according to claim 1, further comprising a setting unit that sets whether or not to perform the user authentication, wherein in a case that it is set not to perform the user authentication, the control unit determines that the association information obtained from the communication unit is valid, and writes the association information into a storing unit.

6. A wireless communication system comprising:

a first NFC token comprising first storage media that store therein association information for establishing a wireless connection;

a second NFC token comprising second storage media that store therein user identification information for identifying a user; and a communication apparatus, wherein the communication apparatus includes a communication unit configured to perform a wireless communication with the first storage media that store therein association information for establishing a wireless connection between the communication apparatus and a data processing apparatus, and perform a wireless communication with second storage media that store user identification information for identifying a user, a control unit configured to respond to a request from the first storage media to set association information, and to obtain the association information from the first storage media via the communication unit and store the association information in volatile memory, and after obtaining the association information for establishing a wireless connection between the communication apparatus and a data processing apparatus, obtain the user identification information from the second storage media via the communication unit, and perform user authentication based on the user identification information from the second storage media, wherein in a case in which the user authentication by the control unit is successful, the association information is stored by the control unit in non-volatile memory and a wireless connection is established between the communication apparatus and the data processing apparatus, and on the other hand, in a case that user authentication by the control unit is not successful, the association information is discarded from the volatile memory by the control unit, and wherein the communication apparatus further comprises a clocking unit that clocks elapsed time since when the control unit determines that the association information is valid, wherein in a case that the association information that is determined to be valid based on the user authentication exceeds a preset expiration period, the control unit determines that the association information is invalid.

7. A method performed by a communication apparatus in a wireless communication system that further includes a first NFC token comprising first storage media that store therein association information for establishing a wireless connection between the communication apparatus and a data processing apparatus, and a second NFC token comprising second storage media that store therein user identification information for identifying a user, the method comprising:

(a) causing a communication unit of the communication apparatus to perform a wireless communication with the first storage media and obtain from the first storage media the association information for establishing a wireless connection between the communication apparatus and a data processing apparatus and store the association information in volatile memory; and (b) causing the communication unit of the communication apparatus to perform a wireless communication with the second storage media and controlling the communication unit, after obtaining the association information for establishing a wireless connection between the communication apparatus and a data processing apparatus, to obtain the user identification information from the second storage media; and (c) performing user authentication based on the user identification information obtained from the second storage media;

(d) in a case in which the user authentication in (c) is successful, storing the association information in non-volatile memory and establishes a wireless connection between the communication apparatus and the data processing apparatus;

(e) in a case that user authentication is not successful, discarding the association information from the volatile memory; and (f) clocking elapsed time since when it is determined in (d) that the association information is valid, and when the elapsed time exceeds a preset expiration period, determining that the association information is invalid.

8. The communication apparatus according to claim 1, wherein the control unit limits available functions of the communication apparatus depending on the user identification information.

9. The communication apparatus according to claim 1, wherein the control unit sets a period available for wireless communications depending on the user identification information.

10. The communication apparatus according to claim 1, wherein the control unit sets a condition parameter needed for the wireless connection between the communication apparatus and the data processing apparatus.

* * * * *